June 29, 1943.  C. SCHIRMER  2,323,101

FISH SCALING DEVICE

Filed Oct. 26, 1942

Inventor
Clara Schirmer
By L. B. James
Attorney

Patented June 29, 1943

2,323,101

UNITED STATES PATENT OFFICE 2,323,101

FISH SCALING DEVICE

Clara Schirmer, Rib Lake, Wis.; Francis P. Schaack administrator of said Clara Schirmer, deceased Application October 26, 1942, Serial No. 463,385

1 Claim. (Cl. 24—253)

This invention relates to the official class of butchering and more particularly to a fish scaling device.

The primary object of this invention resides in the provision of a device adapted to grasp the tail of a fish during the scale removing operation thereof.

Another object of this invention resides in the provision of a device adapted to be removably secured to a stationary support so as to permit the tail of a fish to be readily grasped thereby in convenient position for removing the scales therefrom in the usual manner.

A further object of this invention resides in the particular manner of mounting the clamp on the support thereof.

A still further object of this invention resides in the particular construction of the clamp.

Aside from the aforesaid objects this invention resides in the particular construction and arrangement of the teeth of the clamp.

With these and other objects in view this invention resides in certain novel features of construction and arrangement of elements to be hereinafter more particularly set forth in the specification, illustrated in the accompanying drawing and pointed out in the appended claim and, while this disclosure depicts my present conception of the invention, the right is reserved to resort to such changes in construction and arrangement of elements as come within the scope of the claim.

In the accompanying drawing forming a part of this application:

Figure 1:
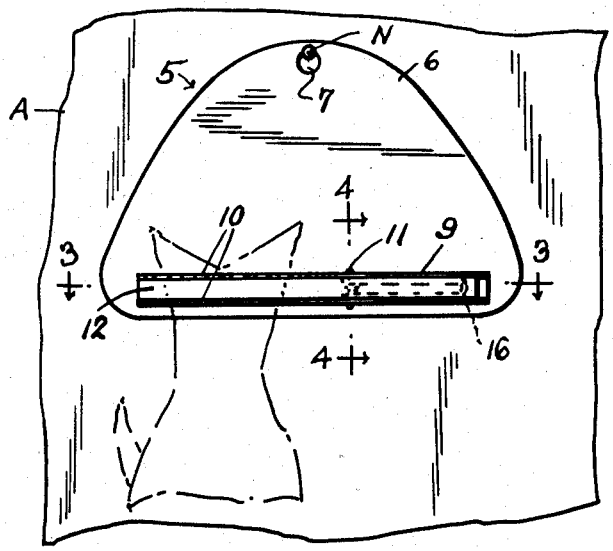
Fig. 1 is a front view of the fish scaling device.
Figure 2:
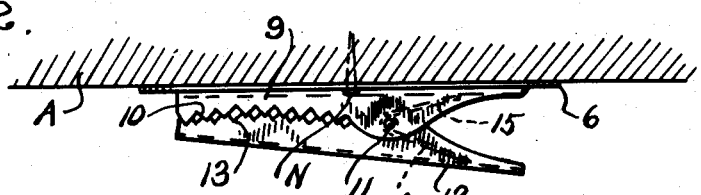
Fig. 2 is a plan view thereof.
Figure 3:
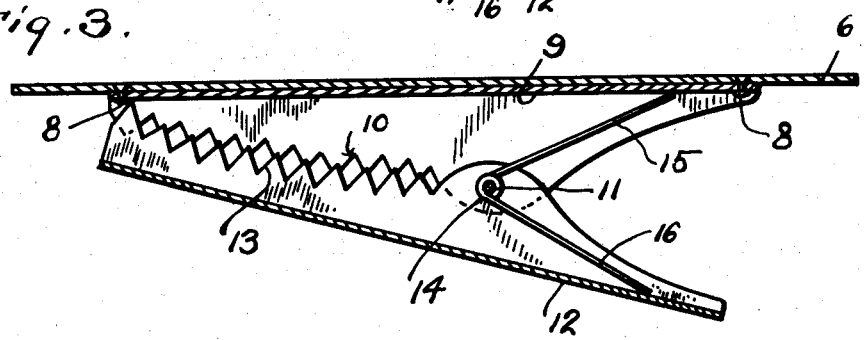
Fig. 3 is an enlarged cross sectional view thereof taken approximately on line 3—3 of Fig. 1.
Figure 4:
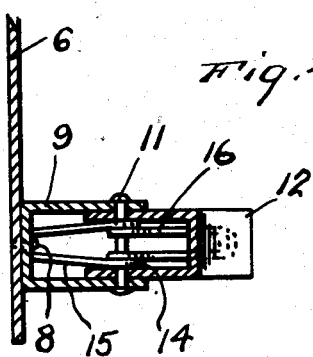
Fig. 4 is a vertical sectional view thereof taken approximately on line 4—4 of Fig. 1.

In the present illustration of this invention the letter A designates a suitable support provided with a nail N or other suitable element on which is adapted to be removably received the fish scaling device forming the subject matter of this invention which is herein designated, in general, by the numeral 5.

The fish scaling device preferably consists of a substantially triangular shape base plate 6 provided with an aperture 7 adapted to receive the aforesaid nail N to retain it in operative position on a support.

Secured to said base plate adjacent the base portion of the triangular configuration thereof, as by rivets 8 or the like, is a stationary U-shape jaw 9 provided with teeth 10 disposed on an inwardly directed arcuate line.

Pivoted to the aforesaid stationary jaw 9, as by a pivotal pin 11, is a movable U-shape clamping jaw 12 provided with teeth 13 disposed on an outwardly directed arcuate line in opposed relation to the teeth 10 and adapted to bear against the inner opposed surfaces of the same when closed.

Supported by the pivotal pins 11 is a looped wire spring 14 having arms 15 bearing against the stationary jaw and other arms 16 bearing against the pivoted jaw and, through the instrumentality of said spring, the pivoted jaw is normally retained in closed position relative to the stationary jaw.

With a fish scaling device constructed as heretofore set forth, it is apparent the tail of a fish can be readily clamped between the teeth of the stationary and pivoted jaws and thus hold the fish in secured position for operation of a scaling tool or the like thereover and, through the simplicity of construction of the device, it can be cheaply manufactured and marketed at a reasonable price.

Having thus described my invention what I claim and desire to protect by Letters Patent is:

A fish scaling device comprising a substantially triangular shape base plate having a supporting element receiving aperture adjacent its apex, a substantially U-shape stationary jaw secured to the base plate adjacent the base portion of the triangle, sets of teeth formed on the sides of the stationary jaw to one side of a center line passing through the base plate and lying on inwardly directed arcuate lines, a substantially U-shape pivoted jaw mounted on the stationary jaw between the sets of teeth thereof, sets of teeth formed on the sides of the pivoted jaw and lying on outwardly directed arcuate lines and in opposed relation to the teeth on the stationary jaw, a pivot pin securing the jaws together and a wire spring mounted on the pivot pin with its opposite ends bearing against the stationary and pivoted jaws to close the same.

CLARA SCHIRMER.